United States Patent [19]

Hora et al.

[11] 4,081,349

[45] Mar. 28, 1978

[54] POLYAMINE MODIFIED MEMBRANES AND CHLOR-ALKALI ELECTROLYSIS CELLS EMPLOYING SAME

[75] Inventors: Charles J. Hora, Willoughby Hills; Andrew D. Babinsky, Chagrin Falls, both of Ohio

[73] Assignee: Diamond Shamrock Corporation, Cleveland, Ohio

[21] Appl. No.: 587,047

[22] Filed: Jun. 16, 1975

Related U.S. Application Data

[63] Continuation-in-part of Ser. No. 515,166, Oct. 16, 1974, abandoned.

[51] Int. Cl.$^2$ .......................... C25B 1/16; C25B 1/26; C25B 13/04
[52] U.S. Cl. .................................. 204/252; 204/258; 204/266; 260/2.1 M; 260/2.2 R; 526/250

[58] Field of Search ................ 204/94, 95, 98, 180 P, 204/301, 252, 266, 263, 296; 260/29.6, 2.2 R, 87.5 A, 92.1, 79.5 MN, 2.1 M

[56] References Cited

U.S. PATENT DOCUMENTS

| 3,647,086 | 3/1972 | Mizutani et al. ................. 204/296 X |
| 3,969,285 | 7/1976 | Grot ................................ 204/262 X |

OTHER PUBLICATIONS

DuPont, "New Ion Exchange Memb. . . . .", (1972).

*Primary Examiner*—Arthur C. Prescott
*Attorney, Agent, or Firm*—Timothy E. Tinkler; John P. Hazzard

[57] ABSTRACT

Disclosed are a sulfonyl group containing fluorocarbon polymer cation-exchange membrane, one side of which has been amine treated to a depth of at least 10 microns, as well as a chlor-alkali electrolytic cell employing same.

9 Claims, No Drawings

POLYAMINE MODIFIED MEMBRANES AND CHLOR-ALKALI ELECTROLYSIS CELLS EMPLOYING SAME

REFERENCE TO A COPENDING APPLICATION

This application is a continuation-in-part of our copending application U.S. Ser. No. 515,166, filed Oct. 16, 1974 now abandoned.

BACKGROUND OF THE INVENTION

A large portion of the chlorine and alkali metal hydroxide produced throughout the world is manufactured in diaphragm-type electrolytic cells wherein the opposed anode and cathode are separated by a fluid permeable diaphragm, usually of asbestos, defining separate anode and cathode compartments. In a typical operation, saturated brine is fed to the anode compartment wherein chlorine is generated at the anode, the brine percolating through the diaphragm into the cathode compartment wherein sodium hydroxide is produced at a concentration within the range of 11 to 18 percent and "contaminated" with large amounts of sodium chloride. This sodium hydroxide must then be concentrated by evaporation and the chloride must be removed to provide a commercial product.

Through the years, substitution of a membrane material for the diaphragm has been proposed. These membranes are substantially impervious to hydraulic flow. In operation, an alkali metal chloride solution is again introduced into the anode compartment wherein chlorine is liberated. Then, in the case of a cation permselective membrane, alkali metal ions are transported across the membrane into the cathode compartment. The concentration of the relatively pure alkali metal hydroxide produced in the cathode compartment is determined by the amount of water added to this compartment, generally from a source exterior the cell. While operation of a membrane cell has many theoretical advantages, its commercial application to the production, for example, of chlorine and caustic has been hindered owing to the low current efficiencies obtained and the often erratic operating characteristics of the cells.

STATEMENT OF THE INVENTION

Therefore, it is an object of the present invention to provide an efficient, relatively supple, cation-exchange membrane for use in the production of chlorine and alkali metal hydroxide.

It is a further object of the present invention to provide a chlor-alkali cell employing a modified cation-exchange membrane, which cell operates at high current efficiencies and low voltages over a relatively broad range of operating conditions, and especially at high alkali metal hydroxide concentrations.

These and further objects of the present invention will become apparent to those skilled in the art from the specification and claims that follow.

There has now been found a cation-exchange membrane derived from a fluorinated polymer containing sulfonyl groups on pendent side chains thereof, one surface of which has been treated with a polyamine whereby a majority of the sulfonyl groups to a depth of at least 10 microns has been converted to the form $SO_2NRR'NRR''$ wherein R is H, Na, or K; R' is $C_3$–$C_6$ alkylene, $Z_2N(R'')$, or $ZN(R'')Z_2N(R'')$; Z is $C_2$–$C_6$ alkylene; and R'' is R or $-SO_2-$. In a preferred embodiment the membrane comprises a surface layer in which the majority of the groups have been converted with ethylene diamine to the form $SO_2NRC_2H_4NRR''$ and a subsurface layer wherein conversion has been with propylene diamine to the form $SO_2NRC_3H_6NRR''$, any remainder of the thickness being in the form $-SO_2R$.

Such membranes find particular utility in chlor-alkali cells and there has therefore been found, in an electrolytic cell comprising a cell container with inlets for electrolyte and outlets for product and electrolyte and having an anode and cathode disposed therein in spaced apart relationship and separated by a cation-exchange membrane, the improvement wherein said membrane is derived from a fluorinated polymer containing sulfonyl groups on pendent side chains thereof, the cathode facing surface of which has been treated with a polyamine whereby a majority of the sulfonyl groups to a depth of at least 10 microns has been converted to the form $SO_2NRR'NRR''$ wherein R is H, Na, or K; R' is $C_3$–$C_6$ alkylene, $Z_2N(R'')$, or $ZN(R'')Z_2N(R'')$; Z is $C_2$–$C_6$ alkylene; and R'' is R or $-SO_2-$. In a preferred embodiment, the membrane comprises a polymer as described having a surface layer the sulfonyl groups of which have been converted with ethylene diamine and a subsurface layer the sulfonyl groups of which have been converted with propylene diamine.

Such a membrane, when employed with amine-treated surface toward the cathode in a chlor-alkali cell, provides a number over advantages of prior membrane cells. It would appear that the provision of the polyamine-modified membrane effectively reduces the back-migration of hydroxide ions to the anode compartment. There follows therefrom a much lower rate of formation of chlorate and oxygen, undesirable contaminants in the anolyte and chlorine gas, respectively, thereby increasing current efficiency, as compared to unmodified membranes. Further, these improved current efficiencies are obtainable over a broad range of operating conditions, and especially at high alkali metal hydroxide concentrations. Still further, it has somewhat surprisingly been found that even quite thin membranes may be employed, while still obtaining almost total exclusion of chloride ion from the catholyte. Unexpectedly low cell voltages are also evidenced. In addition, amination with a polyamine, believed to effect at least partial crosslinking of the cation-exchange membrane between pendent sulfonyl groups, does not render the membrane extremely brittle, thus contributing to ease of handling and processing, even when the majority of the thickness, or even all, of the membrane is so treated.

DESCRIPTION OF THE PREFERRED EMBODIMENTS

The membrane cells to which the present invention applies, as well as the operating conditions thereof, are in many respects conventional. Generally, an enclosure is provided and divided into two compartments by the modified membrane material. In one compartment is disposed an appropriate cathode, generally a metallic material, such as mild steel and the like. The other compartment contains the anode—a conductive, electrocatalytically active material, such as graphite or, more desirably, a dimensionally stable anode, e.g., a titanium substrate bearing a coating of a platinum group metal, platinum group metal oxide, or other electrocatalytically active, corrosion-resistant material. The anode compartment is provided with an outlet for generated chlorine gas, an inlet for alkali metal chloride (i.e., NaCl or KCl) solution, and an outlet for depleted electrolyte. Similarly, the cathode compartment will have outlets for liquid and gaseous products and, generally, an inlet through which water and/or an alkali metal hydroxide solution may be added. In operation, a direct current, generally on the order of from 15 to 45 amperes per square decimeter of membrane, is passed between the electrodes, causing the generation of chlorine at the anode and the selective transport of hydrated alkali metal ions across the membrane into the cathode compartment wherein they combine with hydroxide ions formed at the cathode by the electrolysis of water, hydrogen gas being liberated.

The membrane of the present invention is generally derived from (i.e., results from the amination and saponification of) any fluorinated polymer having pendent side chains bearing sulfonyl groups attached to carbons, on each of which carbons there is at least one fluorine atom. The fluorinated polymers are prepared from monomers that are fluorinated or fluorine-substituted vinyl compounds. They are made from at least two monomers with at least one of the monomers coming from each of the groups (1) fluorinated vinyl compounds, such as vinyl fluoride, hexafluoropropylene, vinylidene fluoride, trifluoroethylene, chlorotrifluoroethylene, perfluoro(alkyl vinyl ether), tetrafluoroethylene, and mixtures thereof, and (2) a sulfonyl-containing monomer containing the precursor —$SO_2F$. Exemplary are $CF_2$=$CFSO_2F$ and, generically, $CF_2$=$CFY_fSO_2F$, wherein $Y_f$ is a bifunctional perfluorinated radical containing from 2–8 carbon atoms. Particularly preferred at this time are copolymers of tetrafluoroethylene with perfluoro(3,6-dioxa-4-methyl-7-octenesulfonyl fluoride) having equivalent weights within the range of 1000 to 1300, especially 1100 to 1200 (grams of polymer per equivalent of proton). The cation-exchange membranes of the type in question are further and more fully described in the following references, the teachings of which as to resin structure and preparation are hereby incorporated by reference: U.S. Pat. Nos. 3,041,317; 3,282,875; and 3,624,053; Dutch Published Application 72/12249; and British Patent 1,184,321.

These membranes, in the unhydrolyzed sulfonyl form and generally having a thickness of from 75 to 250 microns, especially 125 to 200 microns, are then treated with a polyamine so that a majority of the sulfonyl groups on one surface are converted to the form $SO_2NRR'NRR''$ wherein R is H, Na, or K; R' is $C_3$–$C_6$ alkylene, $Z_2N(R'')$, or $ZN(R'')Z_2N(R'')$; Z is $C_2$–$C_6$ alkylene; and R'' is R or —$SO_2$—. The term "polyamine" is used as a matter of convenience to encompass those primary and secondary di-, tri-, and tetramino compounds capable of forming the indicated $SO_2NRR'NRR''$ linkage on reaction with the sulfonyl group. Thus, while ethylene diamine is specifically excluded, illustrative polyamines include: propylene diamine, butylene diamine, diethylene triamine, dipropylene triamine, triethylene tetraamine, and the isomers thereof. Especially preferred at this time is the 1,3-diaminopropane isomer.

Treatment is such that conversion of the sulfonyl groups to the desired form takes place to a depth of at least 10 microns. If less than the 10 microns depth of conversion of a majority of the sulfonyl groups occurs, there is not a sufficient "barrier" to significantly reduce the back-migration of hydroxide ions through the membrane to the anode compartment. The current efficiencies therefore remain low. Greater depths of conversion, including conversion throughout the membrane thickness, are possible and often desirable to insure a sufficient barrier to hydroxide ion back-migration. Increases in operating voltage of the cell are insignificant in contrast to the further improvement in current efficiency and the increased hydroxide concentrations possible, the latter apparently being a function of depth of treatment. As mentioned, treatment with the polyamine is usually not detrimental from the point of view of brittleness imparted. It has been noted that, as the equivalent weight of the membrane increases, it is necessary to treat with the amine to a greater depth in order to obtain the same ability to reduce hydroxide back-migration. Thus, treatment of an 1100 equivalent weight material to the depth of 25 microns may be comparable in terms of current efficiency during operation, to a 1200 equivalent weight membrane treated to 50 microns.

In a preferred embodiment, a membrane particularly tailored to use in chlor-alkali cells is formed by treating the same fluorocarbon polymer having pendent sulfonyl groups, with a combination of ethylene and propylene diamines. Ideally, the surface of the membrane destined to face the cathode is treated to a depth of from 2.5 to 25 microns with ethylene diamine, whereby conversion of a majority of the sulfonyl groups to the form $SO_2NRC_2H_4NRR''$ occurs (R and R'' having the definitions given above). The remainder of the treated depth, preferably up to 50 microns or greater, is with propylene diamine modification of the sulfonyl groups. The advantages of such a multilayered membrane are several. Treatment with ethylene diamine provides a tighter, more efficient barrier to the back-migration of hydroxide ions per unit of depth of treatment than does propylene diamine. Therefore, current efficiency is improved by reducing this back-migration. However, because of this tightness and the apparent rigidity of any crosslinking obtained, membranes treated only with ethylene diamine become stiff and unmanageable as depth of treatment progresses. Therefore, a combination membrane, e.g., wherein the total depth of treatment is 100 microns, may be more effective from a current efficiency standpoint than a membrane treated to a greater depth with propylene diamine alone. This is particularly important since treatment to any depth with either compound detracts somewhat from the physical characteristics of the membrane. Further, since a greater depth of treatment appears to result in an increase in the alkali metal hydroxide concentration directly produced in the cathode compartment and a longer-lived efficient membrane, treatment of the balance of the depth with propylene diamine provides optimum results. It also appears that the propylene diamine layer acts to protect the thinner ethylene diamine layer from disruption by forces moving from the anode side of the membrane.

Thus, a preferred membrane comprises a polymer with a surface layer in which the majority of the groups have been converted with ethylene diamine, and a sub-surface layer in which a majority of the sulfonyl groups have been converted with propylene diamine, the balance of the membrane thickness, if any, containing sulfonyl groups, ultimately, in the hydrolyzed form (i.e., —$SO_3R$).

The manner of converting the membrane to the desired state is not critical except that it must be effective to the recited depth and the physical manipulations must be such that the surface destined to face the cathode is first converted, the "anode surface" being converted only if treatment is throughout. Conveniently, the treatment may proceed by placing the unhydrolyzed sulfonyl form membrane in a suitable asymmetric treating vessel and adding an amine/water solution (typically having a 15–20:1 volume ratio) while maintaining the temperature between about 20° and 120° C. The reaction time will vary depending upon the amine, desired depth of treatment, temperature employed, and the like, as will be seen from the following examples and as may be determined with a minimum of experimentation. The amine solution is then removed, and the vessel and membrane thoroughly washed with water prior to addition of the next amine solution or removal of the membrane for further treatment, as may be appropriate. This final treatment merely comprises a further water rinse and saponification to convert to the alkali metal form for use in the cell, typically employing a solution containing 600 ml water, 400 ml dimethylsulfoxide, and 13 weight percent alkali metal hydroxide. Treatment at a temperature within the range of 85° to 90° C for about 70 minutes suffices, following which the membrane may be removed, rinsed, and soaked in distilled water until employed in the cell. Such treatment, of course, converts any unaminated sulfonyl groups to the $SO_3R$ form.

If the membrane employed is one which has been both ethylene and propylene diamine modified, it is preferred that the ethylene diamine solution be first added and reacted followed by its removal and the addition of propylene diamine solution, with or without intermediate washing but prior to final treatment, e.g., removal, saponificaton, etc. The same procedure generally holds if a number of separate polyamines are employed, although the amines may be mixed in some instances.

Installation of the membrane merely requires positioning between the opposed electrodes with the amine-treated surface facing the cathode. The cell is then sealed and alkali metal chloride solution, typically concentrated brine at a temperature of about 80° to 95° C, is introduced to the anode compartment while water or an aqueous alkali metal hydroxide solution is at least initially fed to the cathode compartment. Most favorable cell operation is found to occur at elevated alkali metal hydroxide concentrations, e.g., on the order of from 350 to 600 grams per liter. The alkali metal hydroxide produced is generally sufficiently concentrated to reduce or eliminate the need for evaporation of water and is of a high degree of purity, usually containing less than 0.1 percent alkali metal chloride.

In order that those skilled in the art may more readily understand the present invention and certain preferred embodiments by which it may be carried into effect, the following specific examples are afforded.

EXAMPLE 1

The membranes to be treated are like copolymers formed from 7 parts of tetrafluoroethylene and 1 part of $CF_2=CFOCF_2CF(CF_3)OCF_2CF_2SO_2F$ having an initial thickness of 208 microns and an equivalent weight of 1100 (grams of polymer per equivalent of proton). Each membrane is sealed across the bottom of a treating vessel into which is introduced a solution of 18 parts by volume of 1,3-diaminopropane and 1 part by volume of water. Treatment continues for the length of time indicated in Table 1 at a temperature held between 60° and 65° C, followed by washing, removal from the vessel, and saponification in a solution containing 600 ml water, 400 ml dimethylsulfoxide, and 13% by weight NaOH maintained at 85° to 90° C for 70 minutes. Each treated membrane is removed, rinsed, and installed wet in a membrane cell spaced 1.6 mm from a nickel cathode and 3.2 mm from an opposed expanded titanium metal anode bearing a $2TiO_2:RuO_2$ mole ratio coating in its surface. Water is added to the cathode compartment, saturated brine (315 g/l) at a temperature of 85° C and a pH of 2.0 to the anode compartment and operation is commenced at 31 amperes per square decimeter. On attaining equilibrium, the operating conditions of the cell are determined as noted in Table 1.

TABLE 1

| Membrane | Time of Treatment (mins.) | Depth of Amination (microns) | Voltage | Current Efficiency (%) | NaOH (g/l) |
|---|---|---|---|---|---|
| 1 | 0 | 0 | 4.1 | 73 | 466 |
| 2 | 17 | 70 | 4.3 | 82 | 536 |
| 3 | 20 | 123 | 4.4 | 86 | 572 |
| 4 | 30 | 185 | 4.4 | 88 | 572 |
| 5 | 60 | 208 | 4.2 | 90 | 590 |
| 6* | 0 | 0 | 4.3 | 75 | 500 |
| 7* | 600 | 206 | 4.8 | 88 | 536 |

*1200 equivalent weight copolymer

Improved operation is evident from the table. In addition, the membranes remain supple and resistant to mechanical failure.

EXAMPLE 2

The procedure of Example 1 is repeated substituting 3,3'-iminobispropylamine (dipropylenetriamine) as the polyamine and employing a treatment time of 460 minutes. In this fashion, a membrane amine treated to a depth of 16 microns is obtained that operates at a voltage of 4.2 and 87% current efficiency, producing 500 g/l NaOH.

EXAMPLE 3

The procedure of Example 1 is again repeated this time employing diethylenetriamine for 300 minutes to yield a membrane aminated to a depth of 21 microns, operating at 4.1 volts and 90% current efficiency to produce 536 g/l NaOH.

EXAMPLE 4

The 1100 equivalent weight membrane starting material described in Example 1 is treated first with an 18:1 solution of ethylenediamine (EDA) in water for the period of time indicated in Table 2 followed by removal of the solution from the vessel, rinsing, and addition of the same strength solution of 1,3-diaminopropane (PDA), again for the indicated time. All other conditions are as set forth in Example 1. Membrane 13 in the following table is further characterized by having a third treatment in the same fashion but employing butylenediamine (BDA) as a third amine layer. Results according to the same test procedure appear in Table 2.

TABLE 2

| Membrane | Amine | Time of Treatment (mins.) | Depth of Amination (microns) | Voltage | Current Efficiency (%) | NaOH (g/l) |
|---|---|---|---|---|---|---|
| 10 | EDA | 25 | 13 | 3.95 | 91 | 518 |
|    | PDA | 40 | 17 |      |    |     |
| 11 | EDA | 42 | 23 | 4.1  | 90 | 536 |
|    | PDA | 120 | 35 |     |    |     |
| 12 | EDA | 6 | 25 | 4.2 | 87 | 500 |
|    | PDA | 24 | 96 |     |    |     |

TABLE 2-continued

| Membrane | Amine | Time of Treatment (mins.) | Depth of Amination (microns) | Voltage | Current Efficiency (%) | NaOH (g/l) |
|---|---|---|---|---|---|---|
| 13 | EDA | 12 | 6 | 4.05 | 91 | 518 |
|  | PDA | 60 | 36 |  |  |  |
|  | BDA | 180 | 38 |  |  |  |

High current efficiencies and low voltages are exhibited throughout while the membrane retains good handling characteristics.

We claim:

1. In an electrolytic cell comprising a cell container with inlets for electrolyte and outlets for products and electrolyte and having an anode and cathode disposed therein in spaced apart relationship and separated by a cation-exchange membrane, the improvement wherein said membrane is a fluorinated polymer having pendent side chains bearing sulfonyl groups attached to carbons having a surface layer facing the cathode in which a majority of the sulfonyl groups to a depth of from 2½ to 10 microns is in the form of $SO_2NR$-$C_2H_4$-$NRR''$, and a subsurface layer adjacent said surface layer in the form $SO_2NRR'NRR''$ wherein R is hydrogen, sodium or potassium; R' is $C_3$-$C_6$ alkylene, $Z_2N(R'')$, or $ZN(R'')Z_2N(R'')$; Z is $C_2$-$C_6$ alkylene; and R'' is R or $-SO_2-$.

2. A cation-exchange membrane comprised of a fluorinated polymer containing sulfonyl groups on pendent side chains thereof, one surface layer of said membrane having a majority of the sulfonyl groups in the form $SO_2NR$-$C_2H_4$-$NRR'$, the subsurface layer having the majority of the sulfonyl groups in the form $SO_2NR$-$C_3H_6$-$NRR''$, any remaining sulfonyl groups being in the form $SO_3R$ wherein R is H, Na, or K and R'' is R or $-SO_2-$.

3. A membrane as in claim 2 wherein the depth of the surface layer is within the range of 2.5 to 10 microns.

4. A membrane as in claim 2 wherein the polymer is a copolymer of tetrafluoroethylene and a sulfonyl-containing monomer of the formula $CF_2=CFY_fSO_2F$ wherein $Y_f$ is a bifunctional perfluorinated aliphatic radical of from 2-8 carbon atoms.

5. The membrane of claim 2 wherein the equivalent weight of the membrane is within the range 1100 to 1200 grams of polymer per equivalent of proton.

6. In an electrolytic cell comprising a cell container with inlets for electrolyte and outlets for products and electrolyte and having an anode and cathode disposed therein in spaced apart relationship and separated by a cation-exchange membrane, the improvement wherein said membrane is a fluorinated polymer having pendent side chains bearing sulfonyl groups attached to carbons having a surface layer facing the cathode in which a majority of the sulfonyl groups is in the form $SO_2NR$-$C_2H_4$-$NRR''$, a subsurface layer in which a majority of the sulfonyl groups is in the form $SO_2NR$-$C_3H_6$-$NRR''$, any remainder of the sulfonyl groups being in the form $SO_3R$, wherein R is H, Na, or K and R'' is R or $-SO_2$.

7. The improvement of claim 6 wherein the membrane has an equivalent weight of from 1100 to 1200 grams of polymer per equivalent of proton.

8. The improvement of claim 6 wherein said polymer is a copolymer of tetrafluoroethylene and a sulfonyl-containing monomer of the formula $CF_2=CFY_fSO_2F$ wherein $Y_f$ is a bifunctional perfluorinated aliphatic radical of from 2-8 carbon atoms.

9. The improvement of claim 6 wherein the depth of said first, surface, layer of said membrane is within the range of 2.5 to 10 microns.

* * * * *